United States Patent
Kim

(10) Patent No.: US 12,128,951 B2
(45) Date of Patent: Oct. 29, 2024

(54) DRIVER ASSISTANCE APPARATUS AND DRIVER ASSISTANCE METHOD

(71) Applicant: MANDO MOBILITY SOLUTIONS CORPORATION, Pyeongtaek-si (KR)

(72) Inventor: Mingyu Kim, Seongnam-si (KR)

(73) Assignee: HL KLEMOVE CORP., Incheon (KR)

( * ) Notice: Subject to any disclaimer, the term of this patent is extended or adjusted under 35 U.S.C. 154(b) by 293 days.

(21) Appl. No.: 17/563,634

(22) Filed: Dec. 28, 2021

(65) Prior Publication Data

US 2022/0204083 A1 Jun. 30, 2022

(30) Foreign Application Priority Data

Dec. 29, 2020 (KR) .......................... 10-2020-0185789

(51) Int. Cl.
- *B62D 15/02* (2006.01)
- *B62D 5/04* (2006.01)
- *G06T 7/70* (2017.01)
- *G06V 20/58* (2022.01)

(52) U.S. Cl.
CPC ............ *B62D 15/0265* (2013.01); *G06T 7/70* (2017.01); *G06V 20/58* (2022.01); *B62D 5/0463* (2013.01); *G06T 2207/30261* (2013.01)

(58) Field of Classification Search
CPC .. B62D 15/0265; B62D 15/0255; G06T 7/70; G06T 2207/30261; G06V 20/58; B60W 30/09; B60W 30/095
See application file for complete search history.

(56) References Cited

U.S. PATENT DOCUMENTS

| | | | |
|---|---|---|---|
| 7,016,783 B2* | 3/2006 | Hac .................... | B60W 30/09 303/146 |
| 9,731,755 B1* | 8/2017 | Moshchuk ............ | B62D 6/04 |
| 2004/0193374 A1 | 9/2004 | Hae | |
| 2008/0189013 A1* | 8/2008 | Iwazaki ............ | B60W 40/114 701/41 |
| 2018/0290686 A1* | 10/2018 | Minoiu Enache .... | B60W 30/12 |
| 2021/0061266 A1* | 3/2021 | Pontisakos ........ | B60W 30/0956 |

OTHER PUBLICATIONS

A Office Action of the corresponding CN application.

* cited by examiner

*Primary Examiner* — Ig T An
(74) *Attorney, Agent, or Firm* — Harvest IP Law, LLP

(57) ABSTRACT

Provided is a driver assistance apparatus, including: a camera mounted on a vehicle and configured to have a field of view facing a front of the vehicle and acquire image data; and a controller including a processor configured to process the image data, wherein the controller is configured to calculate a target heading angle and a target lateral position of the vehicle based on a predetermined yaw rate pattern, and when a driver operates a steering device that steers the vehicle to avoid a collision of the vehicle, control the steering device to assist in steering for avoiding the collision of the vehicle, based on at least one of the image data, the target heading angle or the target lateral position.

20 Claims, 14 Drawing Sheets

[FIG. 1]
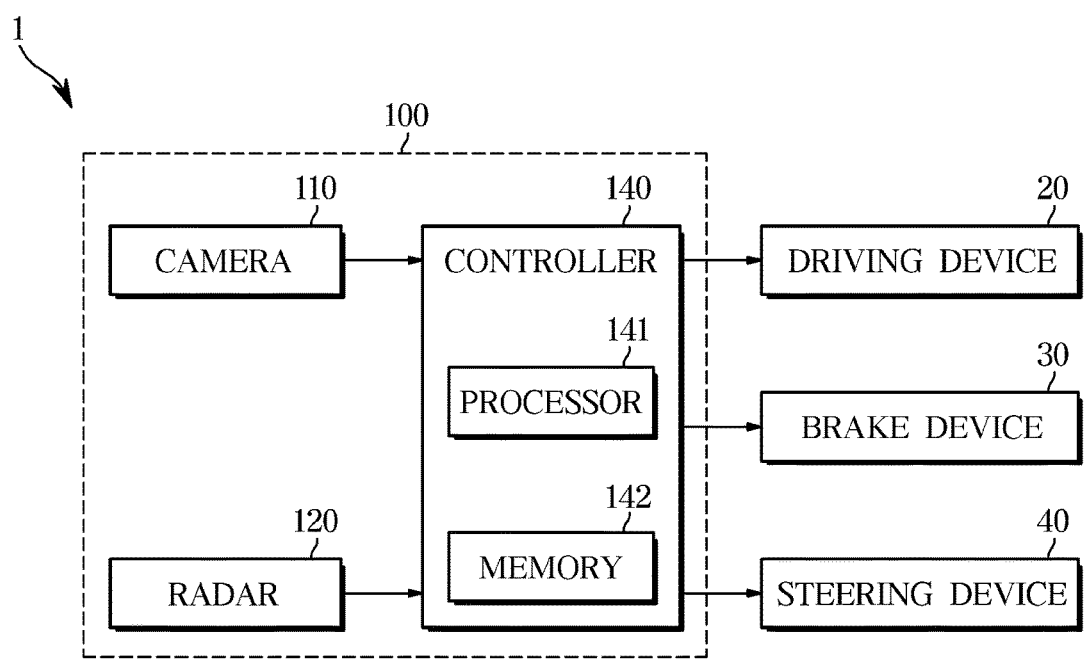

[FIG. 2]
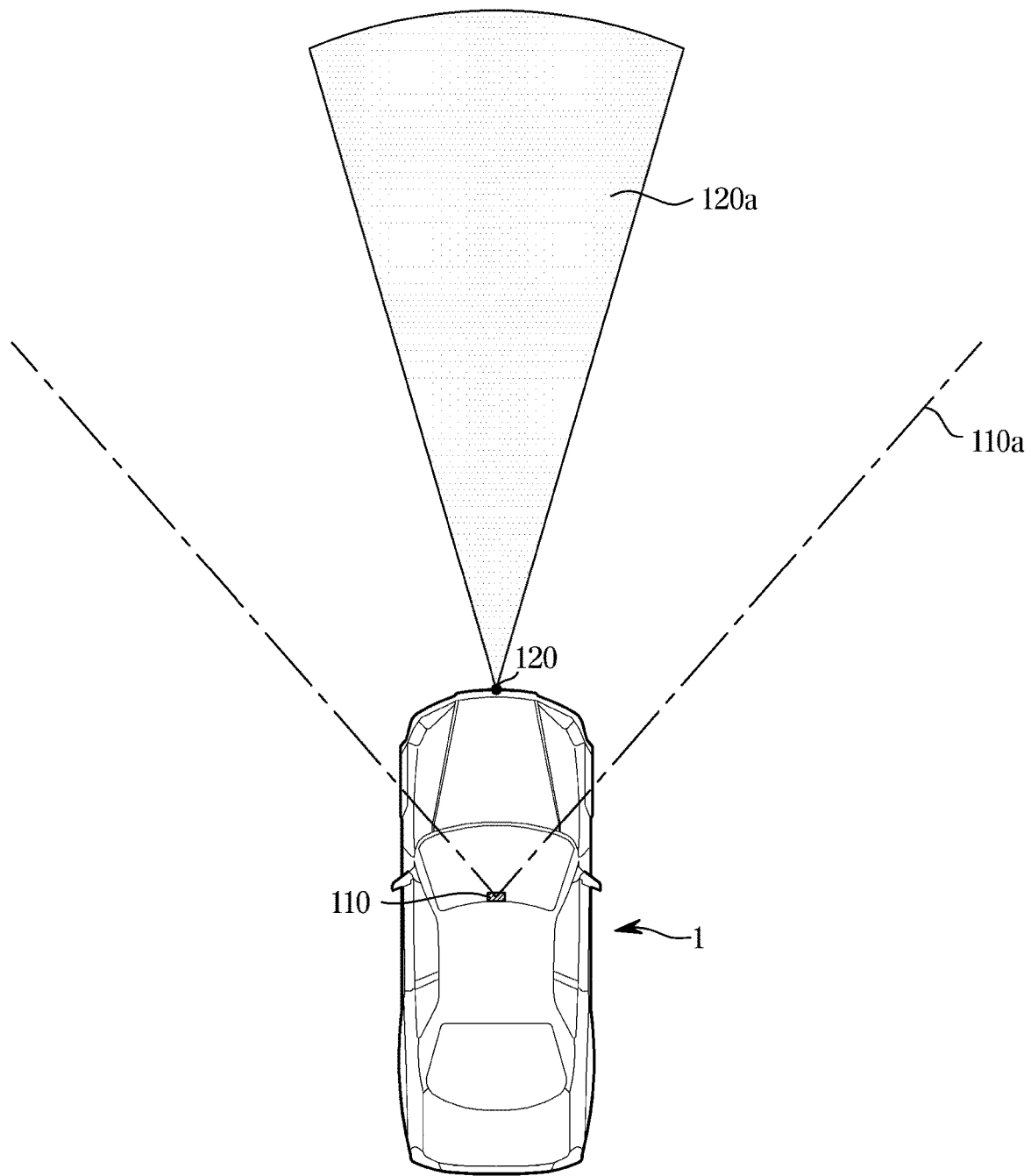

[FIG. 3A]
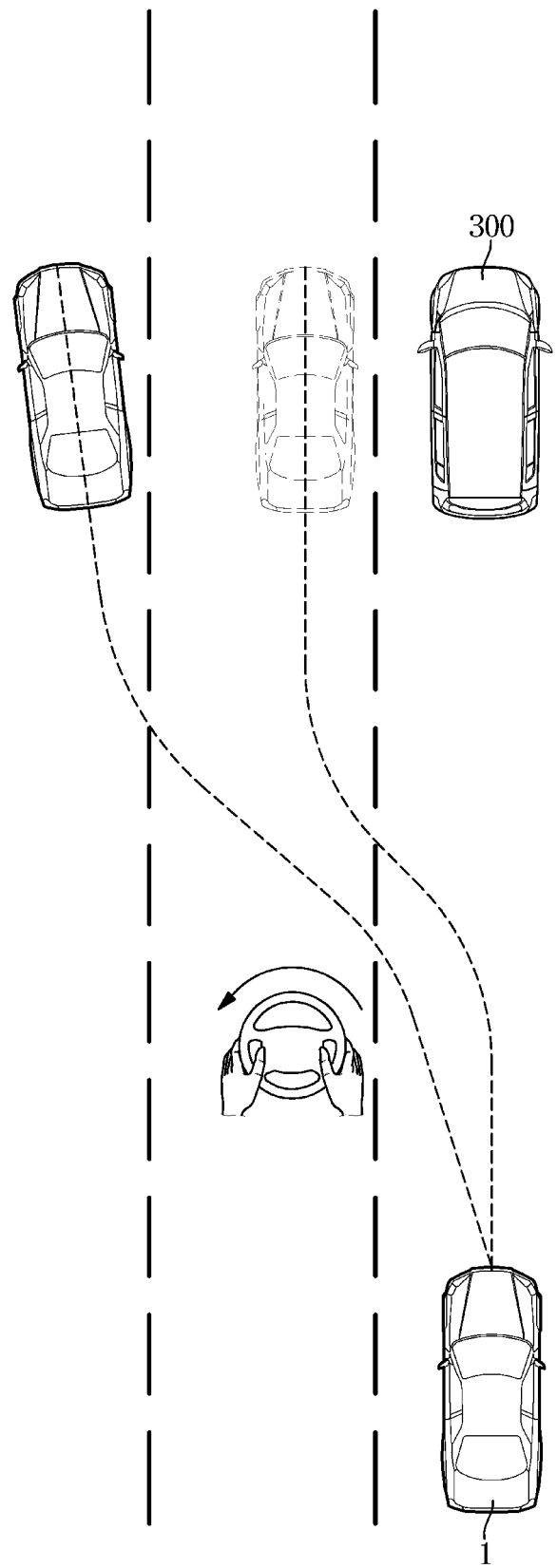

[FIG. 3B]
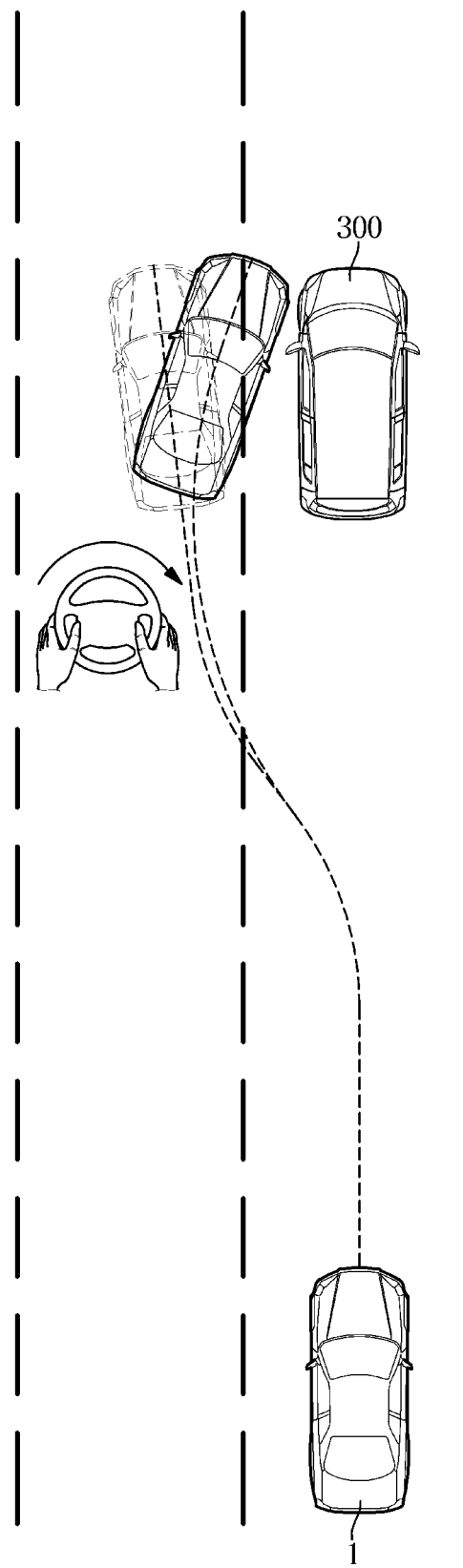

[FIG. 4]
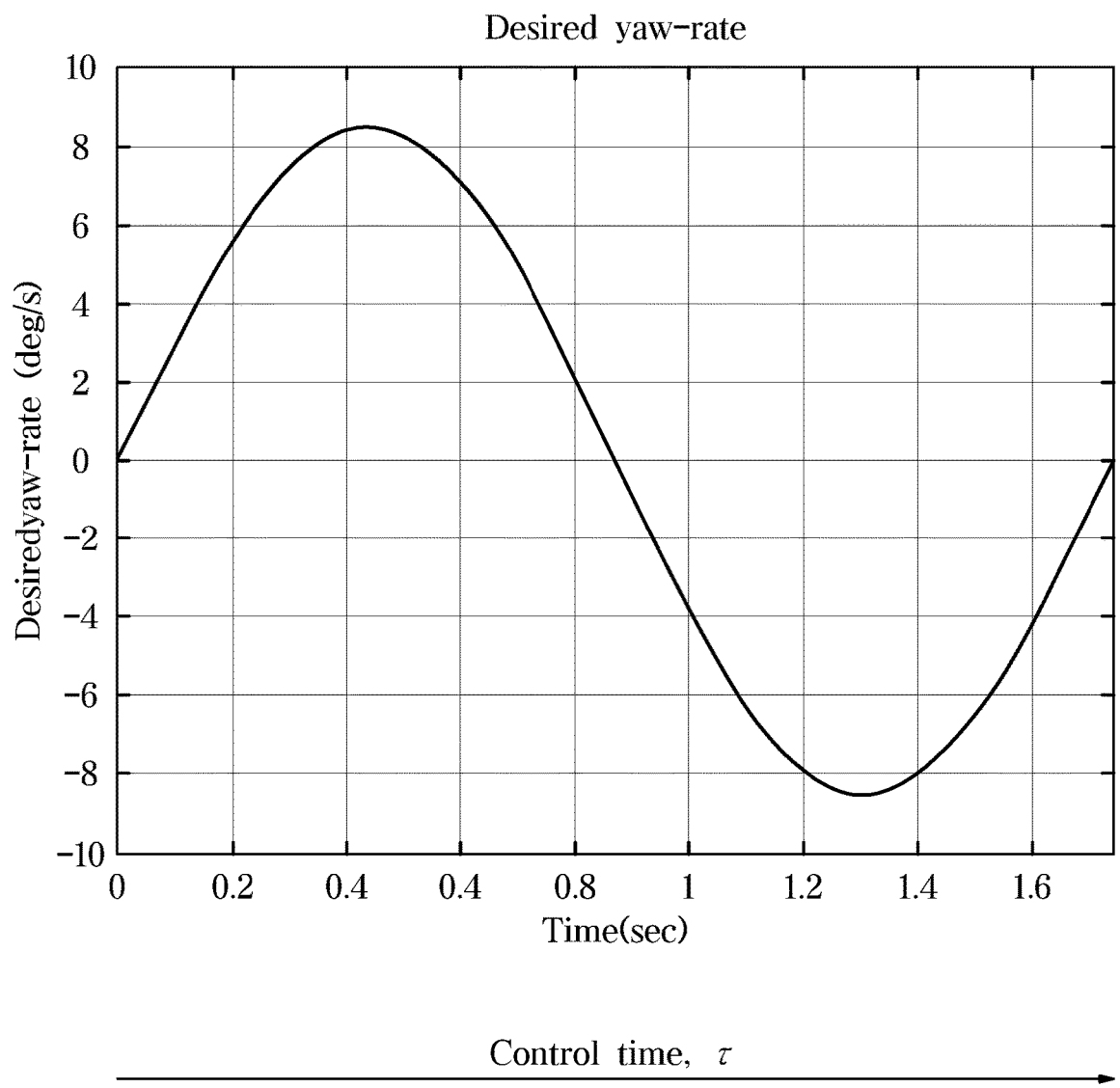

[FIG. 5]
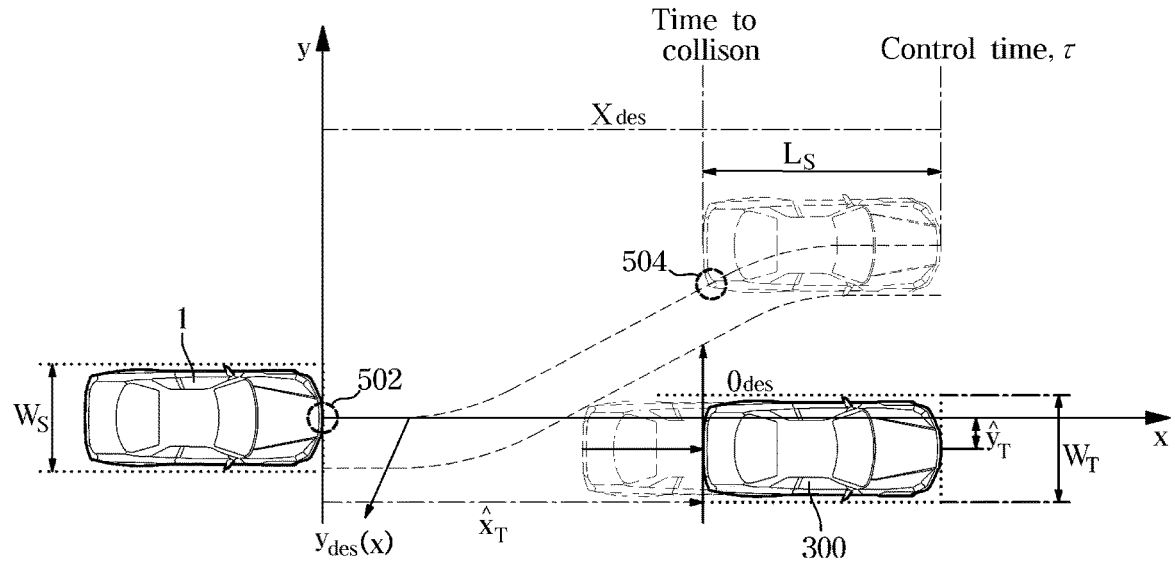
[FIG. 6A]
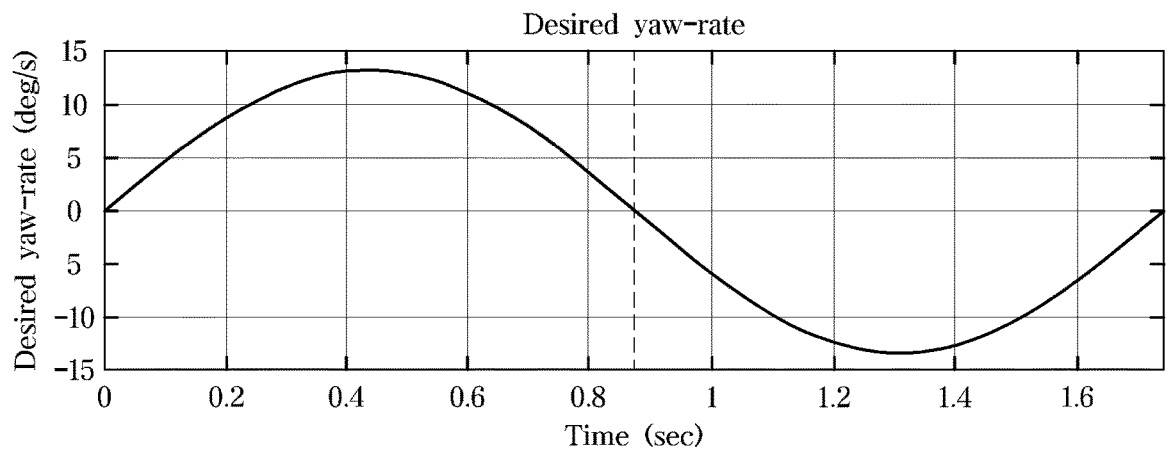

[FIG. 6B]
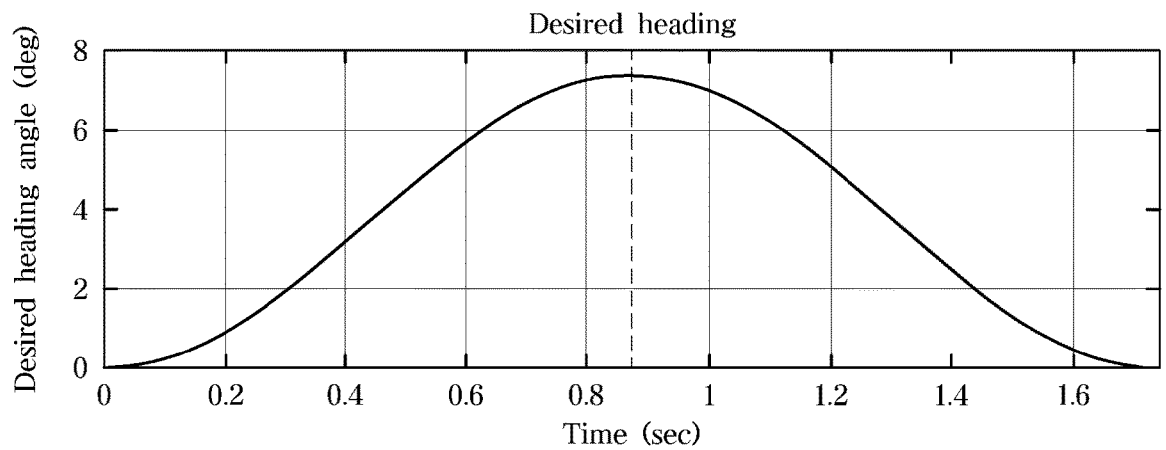
[FIG. 6C]
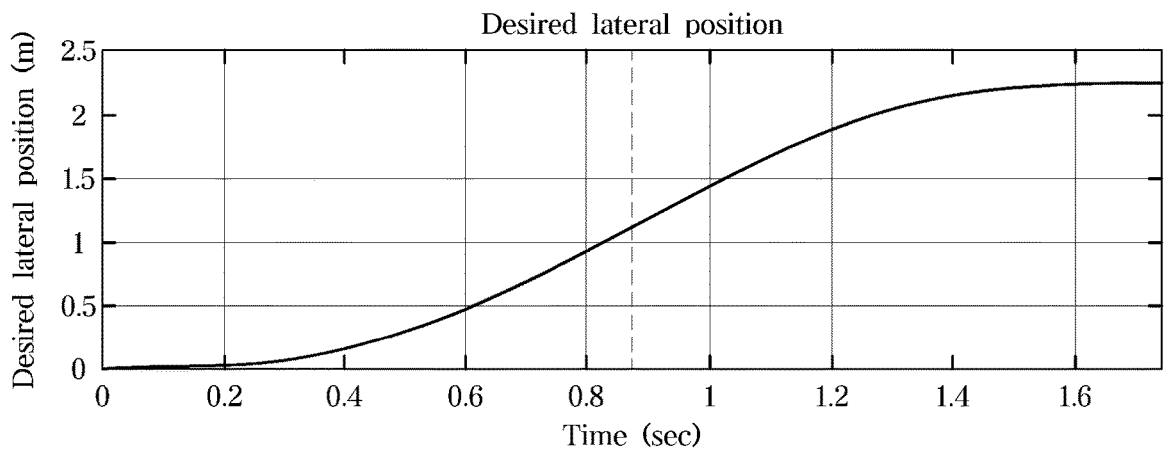

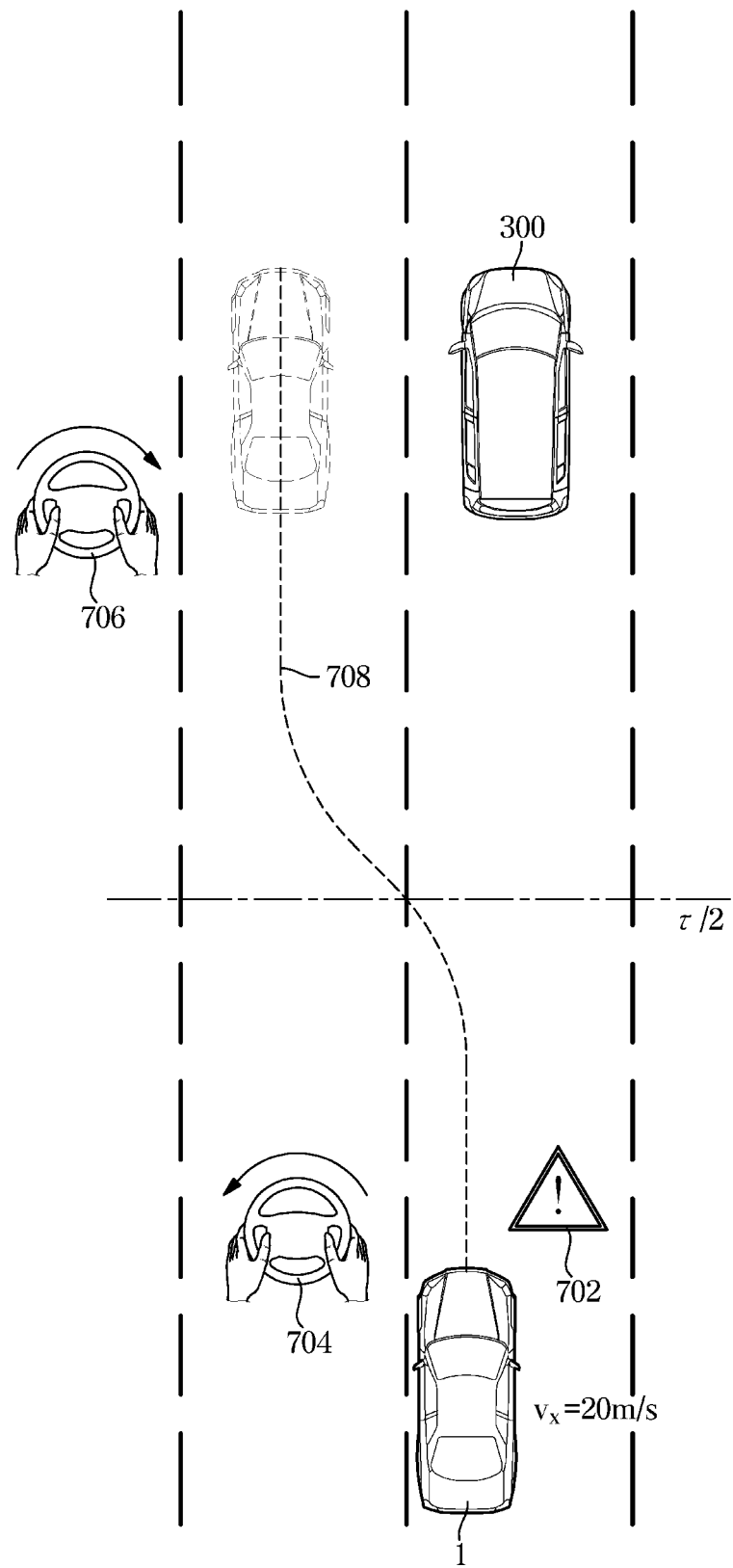
[FIG. 7]

[FIG. 8]
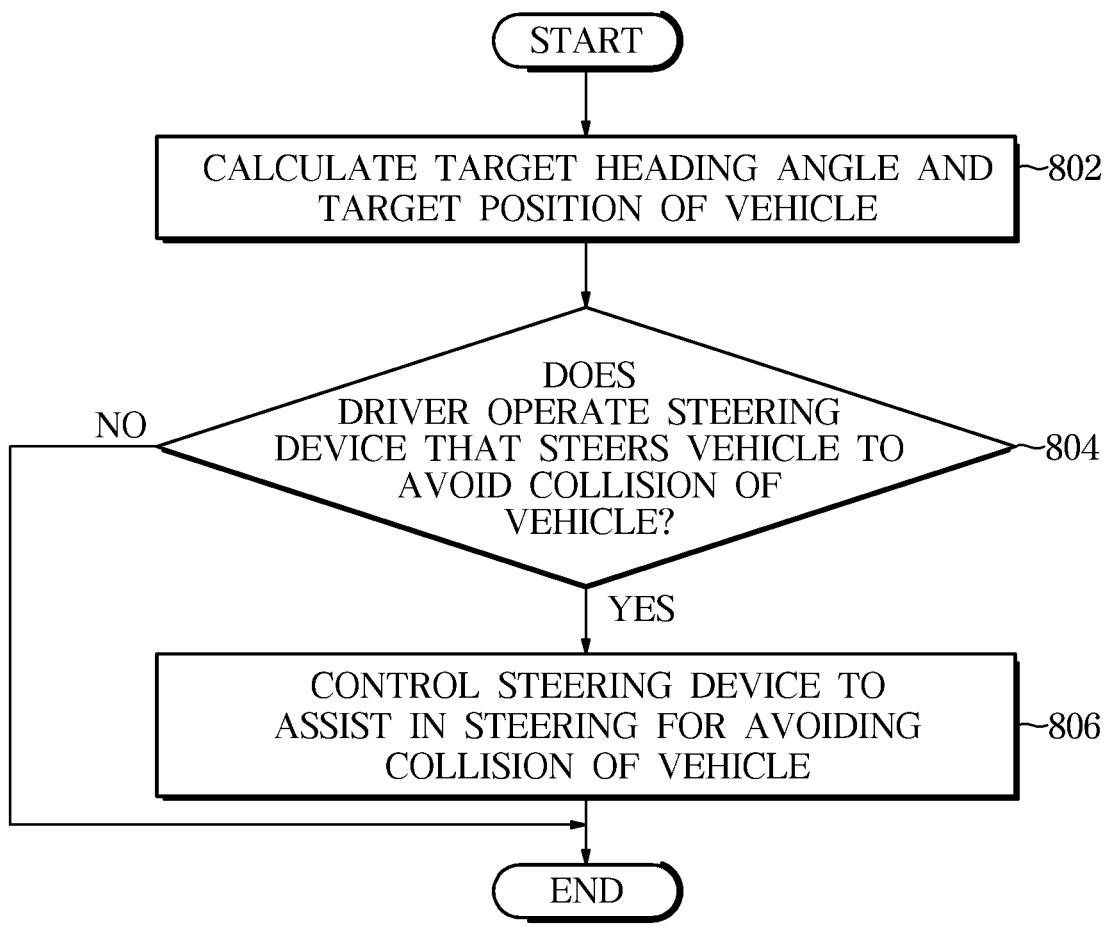

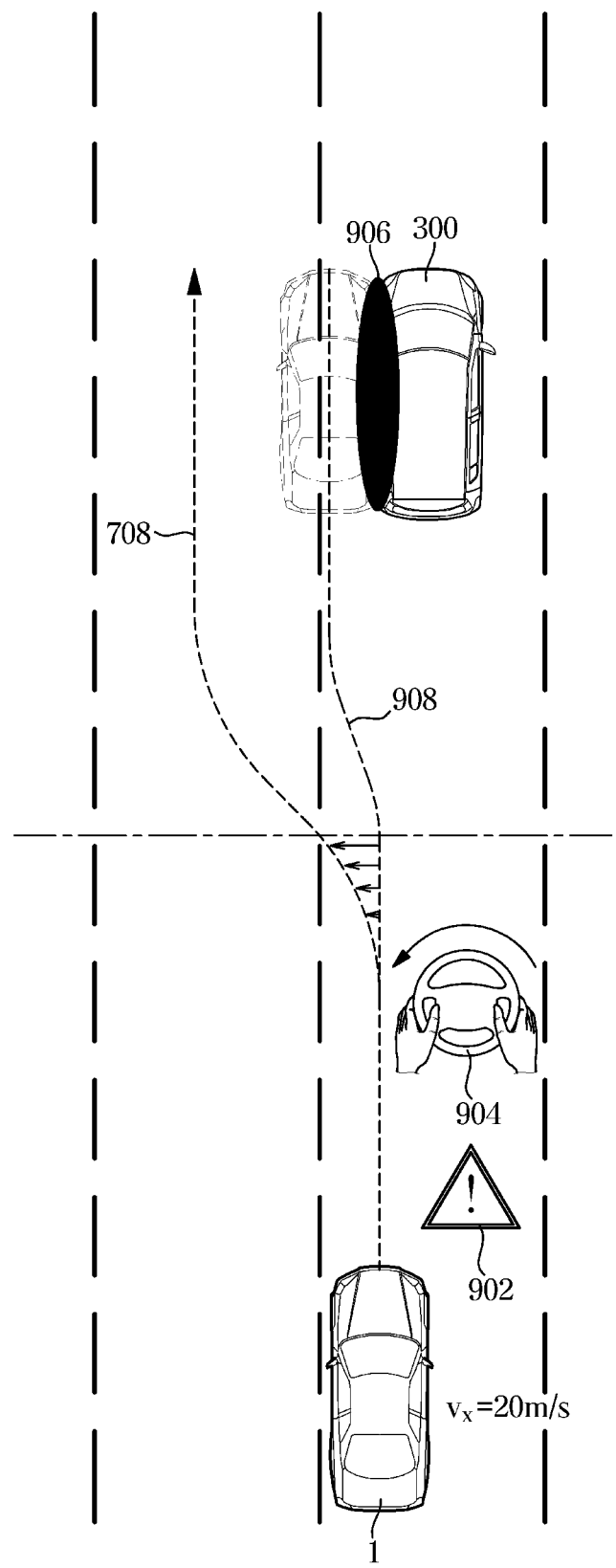
[FIG. 9]

[FIG. 10A]
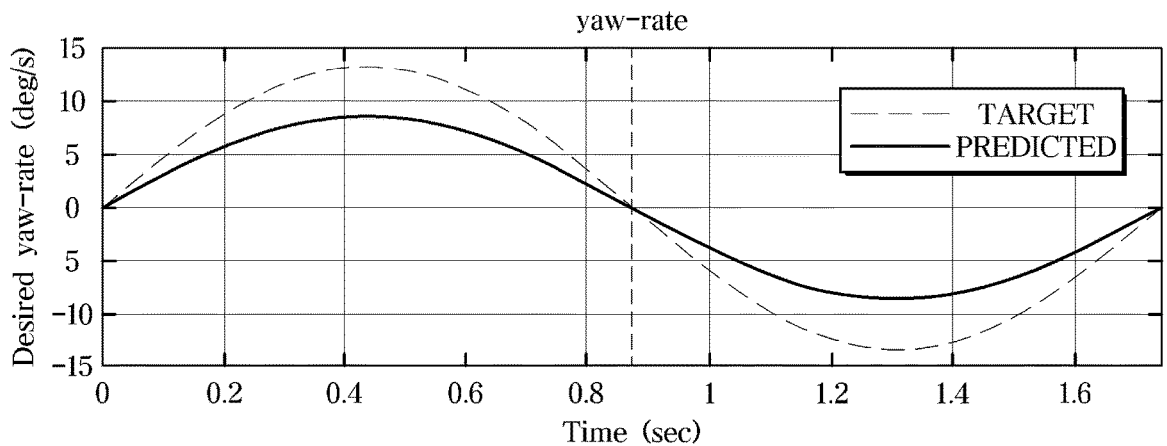
[FIG. 10B]
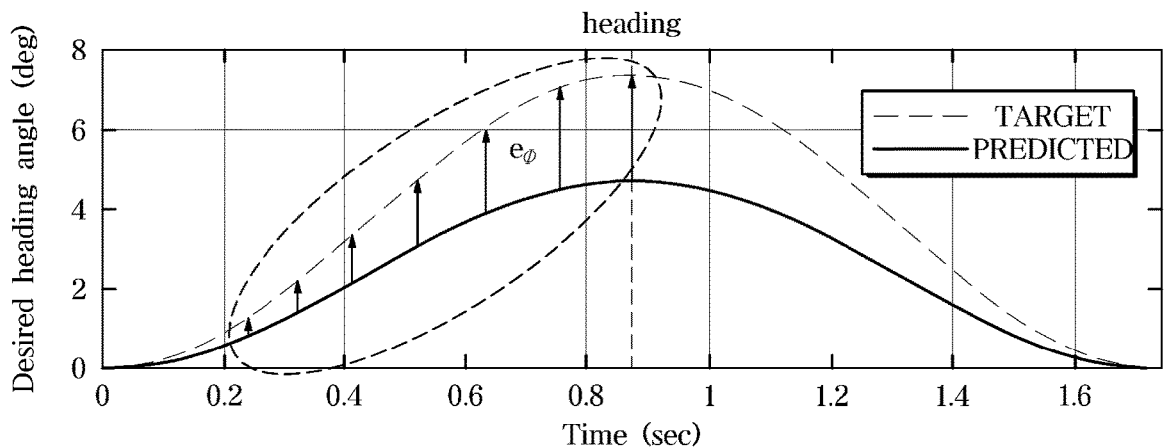
[FIG. 10C]
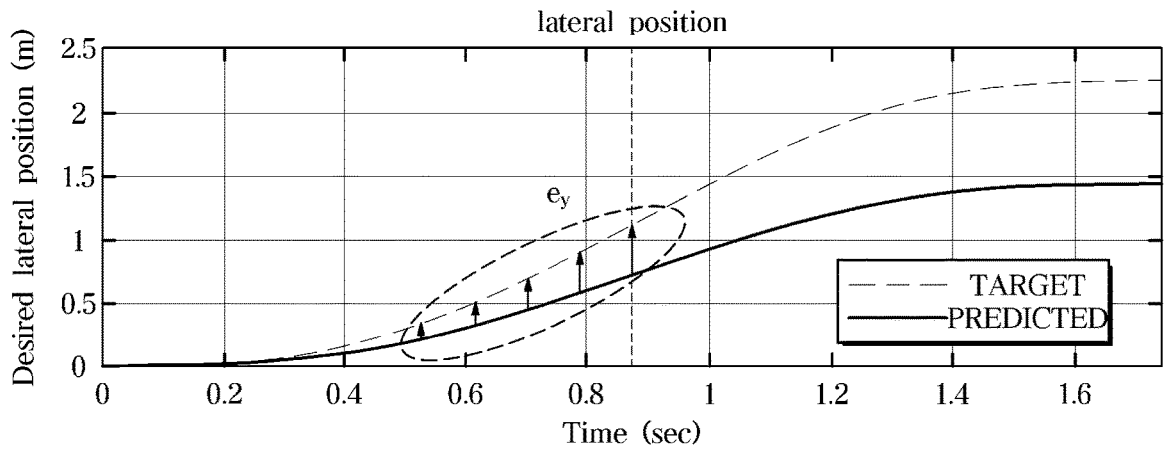

[FIG. 11]
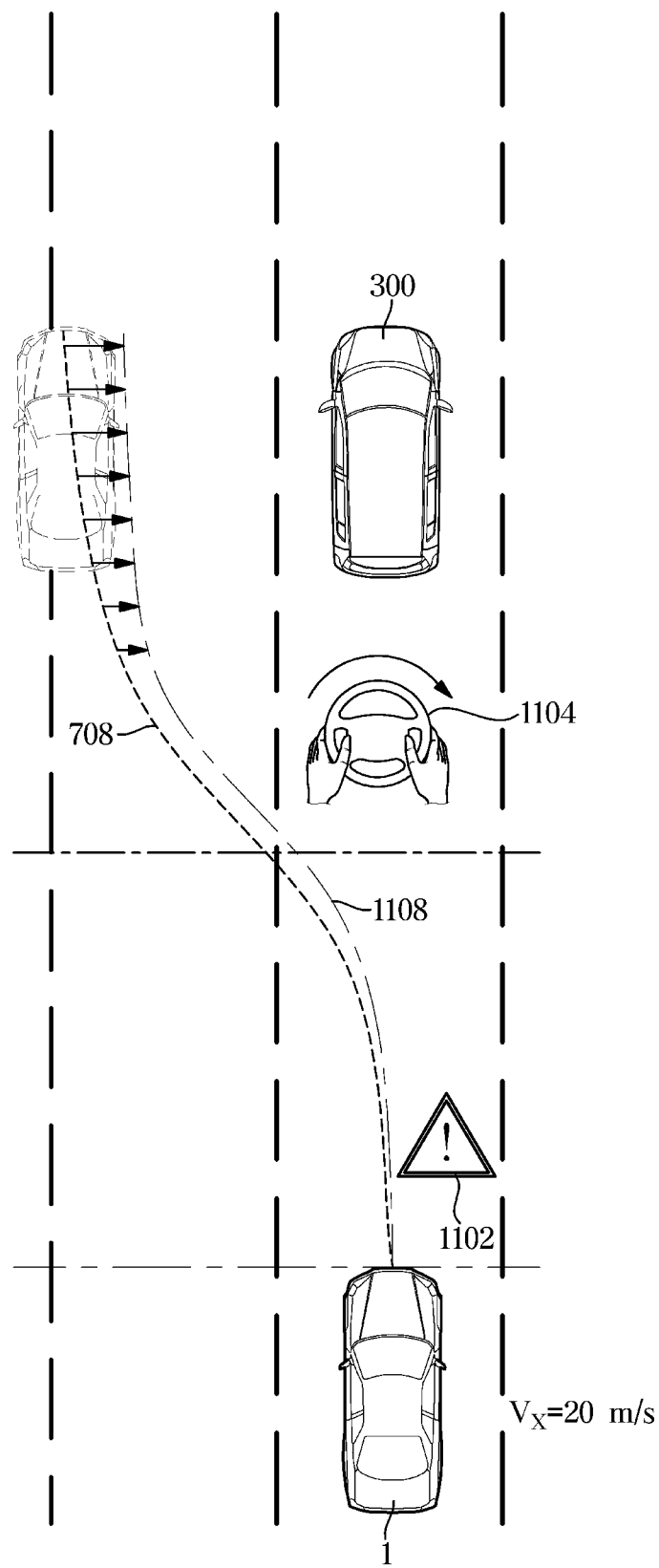

[FIG. 12A]
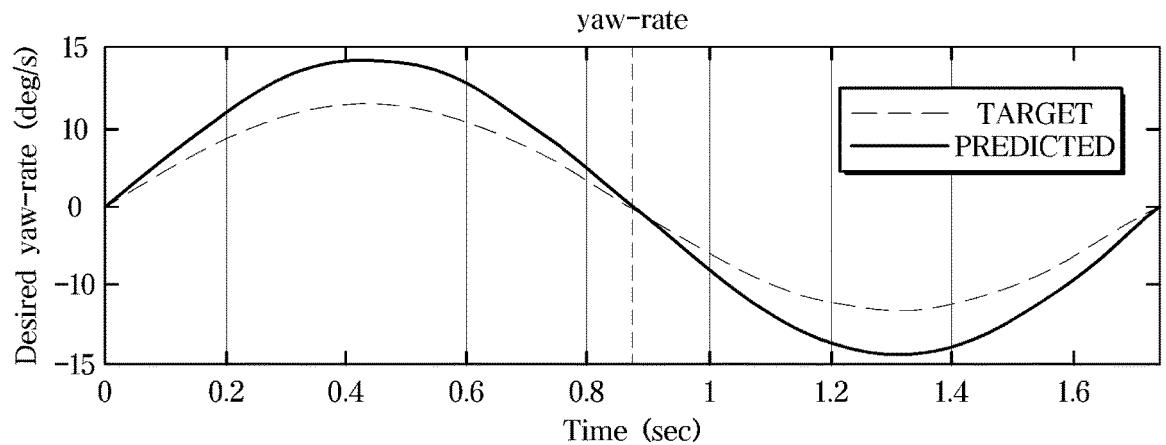
[FIG. 12B]
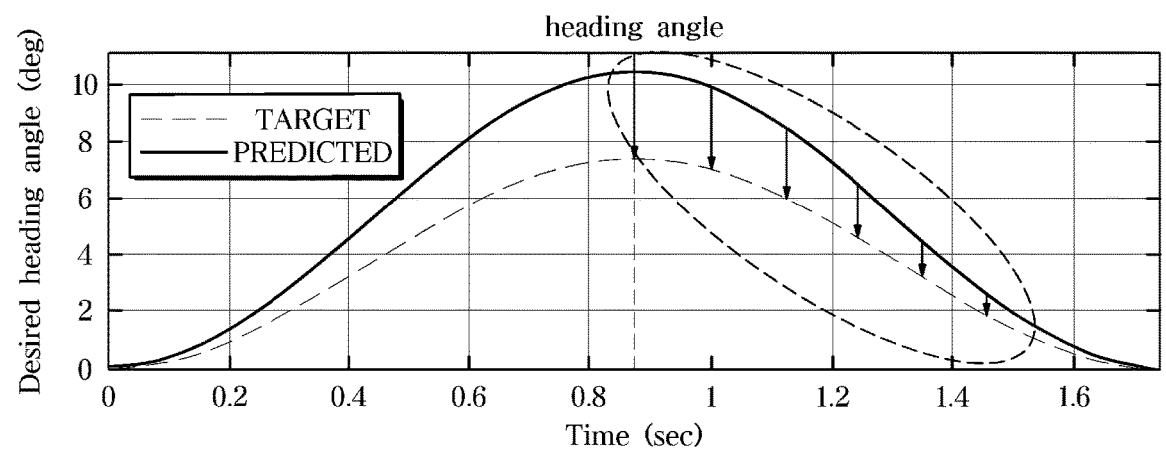
[FIG. 12C]
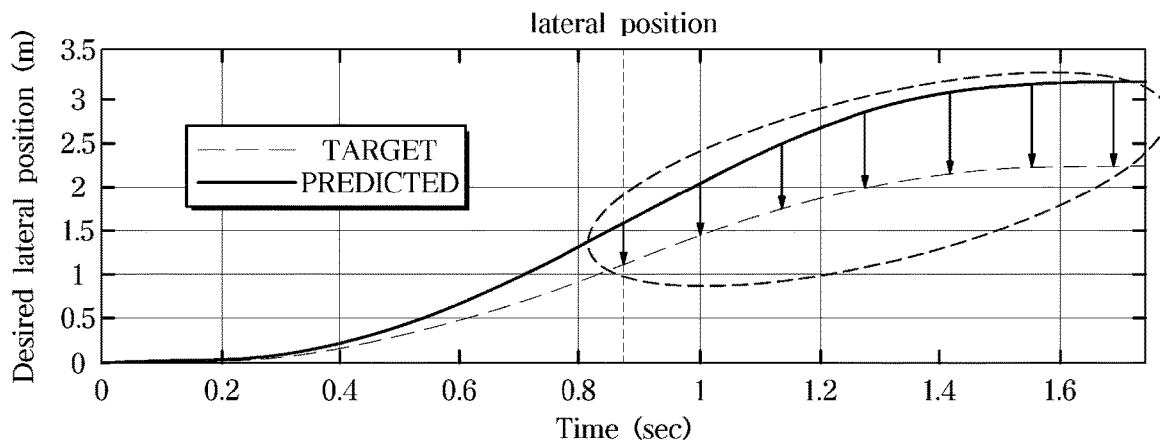

[FIG. 13]
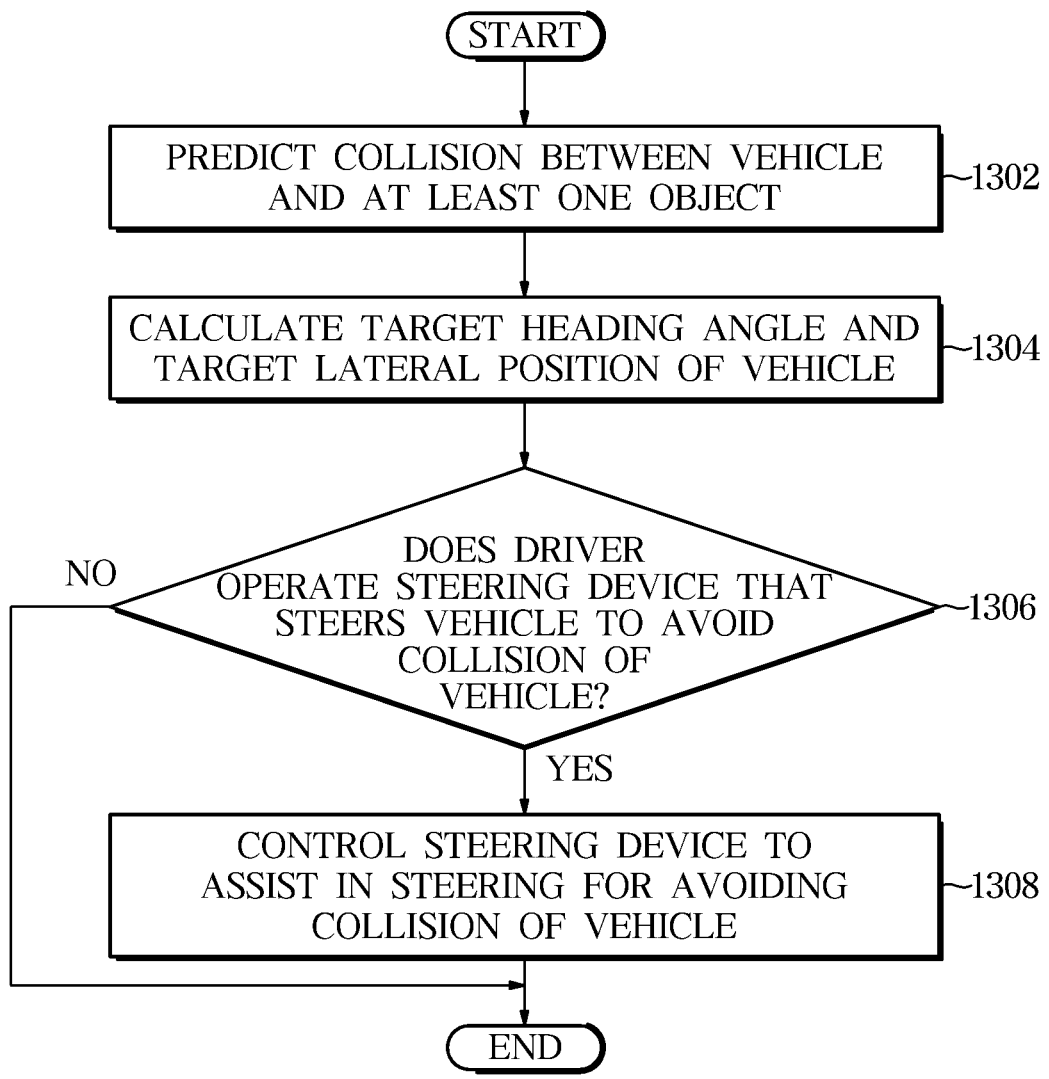

DRIVER ASSISTANCE APPARATUS AND DRIVER ASSISTANCE METHOD

CROSS-REFERENCE TO RELATED APPLICATION

This application is based on and claims priority under 35 U.S.C. § 119 to Korean Patent Application No. 10-2020-0185789, filed on Dec. 29, 2020 in the Korean Intellectual Property Office, the disclosure of which is incorporated herein by reference.

BACKGROUND

1. Technical Field

The disclosure relates to a driver assistance apparatus and a driver assistance method, and more specifically, to a driver assistance apparatus and a driver assistance method that may avoid a collision with an object.

2. Background Art

Much research on vehicles equipped with advanced driver assistance systems (ADAS) that actively provide information about a vehicle state, a driver state and traffic environment have been recently carried out to reduce drivers' burden and improve convenience.

ADAS may identify a possible collision situation with an object during driving and provide a collision avoidance and/or alert signal in dangerous situations.

For example, ADAS include a collision avoidance system (CAS), an autonomous emergency brake (AEB), a driver attention warning (DAW), and the like.

In the CAS, a driver evasive steering assistance system has been developed to assist in steering in order to avoid a collision with another vehicle due to driver's operation when a collision is likely to occur.

The driver evasive steering assistance system operates according to a driver's avoidance intention, and may provide a steering torque (also referred to as an assist torque) capable of assisting the torque generated based on the driver's operation, or make a steering wheel lighter to easily perform steering control of the vehicle.

However, unconditional intervention of assist torque or the inappropriate amount of assist torque may rather hinder the driver's operation to avoid collision.

When a driver operates a vehicle to avoid collision, an assist torque may rather disturb the operation to avoid collision due to various variables such as an avoidance direction of the vehicle, the required amount of evasive steering, the driver's intervention timing for evasive steering, the driver's driving style, and the like.

For instance, the assist torque may generate greater steering than intended by the driver, leading to lane departure. As another example, greater assist torque that assists counter-steering than intended by the driver may be generated due to assist torque, causing a collision with another vehicle.

SUMMARY

An aspect of the disclosure provides a driver assistance apparatus and a driver assistance method that may allow a vehicle to stably avoid a collision with an arbitrary object by adjusting an intervention and the control amount of assist torque based on a driver's operation depending on circumstances.

Additional aspects of the disclosure will be set forth in part in the description which follows and, in part, will be obvious from the description, or may be learned by practice of the disclosure.

According to an aspect of the disclosure, there is provided a driver assistance apparatus, including: a camera mounted on a vehicle and configured to have a field of view facing a front of the vehicle and acquire image data; and a controller including a processor configured to process the image data, wherein the controller is configured to calculate a target heading angle and a target lateral position of the vehicle based on a predetermined yaw rate pattern, and when a driver operates a steering device that steers the vehicle to avoid a collision of the vehicle, control the steering device to assist in steering for avoiding the collision of the vehicle, based on at least one of the image data, the target heading angle or the target lateral position.

The controller is configured to control the steering device to assist in steering for avoiding the collision of the vehicle so that the vehicle does not cross a target lane.

The controller is configured to predict the collision between the vehicle and at least one object, based on the image data, identify a predicted heading angle and a predicted lateral position of the vehicle based on the prediction of the collision, and control the steering device to assist in steering for avoiding the collision of the vehicle, based on the target heading angle, the target lateral position, the predicted heading angle and the predicted lateral position.

The controller is configured to calculate a steering torque of the steering device based on the target heading angle, a difference between the target heading angle and the predicted heading angle, the target lateral position, and a difference between the target lateral position and the predicted lateral position, and control the steering device to assist in steering for avoiding the collision of the vehicle, based on control of the steering device based on the steering torque.

The controller is configured to calculate a target lateral acceleration and a target lateral speed of the vehicle based on the predetermined yaw rate pattern and a speed of the vehicle, and calculate the target heading angle and the target lateral position based on the target lateral acceleration and the target lateral speed.

The predetermined yaw rate pattern corresponds to a target driving trajectory of the vehicle that allows the vehicle to be spaced apart from a first object by a predetermined distance, when steering for avoiding the collision of the vehicle.

According to an aspect of the disclosure, there is provided a driver assistance method, including: calculating a target heading angle and a target lateral position of a vehicle based on a predetermined yaw rate pattern; and when a driver operates a steering device that steers the vehicle to avoid a collision of the vehicle, controlling the steering device to assist in steering for avoiding the collision of the vehicle, based on at least one of image data acquired through a camera, the target heading angle or the target lateral position The controlling of the steering device to assist in steering for avoiding the collision of the vehicle includes controlling the steering device so that the vehicle does not cross a target lane.

The controlling of the steering device to assist in steering for avoiding the collision of the vehicle includes predicting the collision between the vehicle and at least one object, based on the image data, identifying a predicted heading angle and a predicted lateral position of the vehicle based on the prediction of the collision, and controlling the steering device to assist in steering for avoiding the collision of the vehicle, based on the target heading angle, the target lateral position, the predicted heading angle and the predicted lateral position.

The controlling of the steering device to assist in steering for avoiding the collision of the vehicle includes calculating a steering torque of the steering device based on the target heading angle, a difference between the target heading angle and the predicted heading angle, the target lateral position, and a difference between the target lateral position and the predicted lateral position, and controlling the steering device to assist in steering for avoiding the collision of the vehicle, based on control of the steering device based on the steering torque.

The calculating of the target heading angle and the target lateral position includes calculating a target lateral acceleration and a target lateral speed of the vehicle based on the predetermined yaw rate pattern and a speed of the vehicle, and calculating the target heading angle and the target lateral position based on the target lateral acceleration and the target lateral speed.

The predetermined yaw rate pattern corresponds to a target driving trajectory of the vehicle that allows the vehicle to be spaced apart from a first object by a predetermined distance, when steering for avoiding the collision of the vehicle.

According to an aspect of the disclosure, there is provided a driver assistance apparatus, including: a camera mounted on a vehicle and configured to have a field of view facing a front of the vehicle and acquire image data; and a controller including a processor configured to process the image data, wherein the controller is configured to predict a collision between the vehicle and at least one object based on the image data, calculate a target heading angle and a target lateral position of the vehicle based on the prediction of the collision between the vehicle and the at least one object and a predetermined yaw rate pattern, and when a driver operates a steering device that steers the vehicle to avoid the collision of the vehicle, control the steering device to assist in steering for avoiding the collision of the vehicle, based on at least one of the target heading angle or the target lateral position.

The controller is configured to identify whether the steering device that steers the vehicle to avoid the collision of the vehicle is operated by the driver, in response to the predicted collision between the vehicle and the at least one object.

The controller is configured to control the steering device to assist in steering for avoiding the collision of the vehicle so that the vehicle does not cross a target lane.

The controller is configured to predict the collision between the vehicle and the at least one object, based on the image data, identify a predicted heading angle and a predicted lateral position of the vehicle based on the prediction of the collision, and control the steering device to assist in steering for avoiding the collision of the vehicle, based on the target heading angle, the target lateral position, the predicted heading angle and the predicted lateral position.

The controller is configured to calculate a steering torque of the steering device based on the target heading angle, a difference between the target heading angle and the predicted heading angle, the target lateral position, and a difference between the target lateral position and the predicted lateral position, and control the steering device to assist in steering for avoiding the collision of the vehicle, based on control of the steering device based on the steering torque.

The controller is configured to calculate a target lateral acceleration and a target lateral speed of the vehicle based on the predetermined yaw rate pattern and a speed of the vehicle, and calculate the target heading angle and the target lateral position based on the target lateral acceleration and the target lateral speed.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 illustrates a configuration of a vehicle according to an embodiment;

FIG. 2 illustrates fields of view of a camera and a radar included in a driver assistance apparatus according to an embodiment;

FIGS. 3A and 3B are diagrams illustrating operations of a vehicle based on a conventional driver evasive steering assistance system;

FIG. 4 is a diagram illustrating a predetermined yaw rate pattern according to an embodiment;

FIG. 5 is a diagram illustrating a collision avoidance design of a vehicle according to an embodiment;

FIGS. 6A, 6B and 6C are graphs illustrating a predetermined yaw rate pattern, a target lateral position function and a target heading angle function corresponding to yaw rate pattern according to an embodiment;

FIG. 7 is a diagram illustrating an operation of controlling a steering device to assist in steering for collision avoidance of a vehicle according to an embodiment;

FIG. 8 is a flowchart illustrating operations of a driver assistance apparatus according to an embodiment;

FIG. 9 is a diagram illustrating a collision avoidance operation of a vehicle based on the control of driver assistance apparatus according to an embodiment;

FIGS. 10A, 10B and 10C are graphs illustrating a target driving trajectory and a predicted driving trajectory of a vehicle according to an embodiment;

FIG. 11 is a diagram illustrating a collision avoidance operation of a vehicle based on the control of driver assistance apparatus according to an embodiment;

FIGS. 12A, 12B and 12C are graphs illustrating a target driving trajectory and a predicted driving trajectory of a vehicle according to an embodiment; and FIG. 13 is a flowchart illustrating operations of a driver assistance apparatus according to an embodiment.

DETAILED DESCRIPTION

Like reference numerals throughout the specification denote like elements. Also, this specification does not describe all the elements according to embodiments of the disclosure, and descriptions well-known in the art to which the disclosure pertains or overlapped portions are omitted. The terms such as "~part", "~member", "~module", "~block", and the like may be implemented with at least one hardware or software. According to embodiments, a plurality of "~part", "~member", "~module", "~block" may be embodied as a single element, or a single of "~part", "~member", "~module", "~block" may include a plurality of elements.

It will be understood that when an element is referred to as being "connected" to another element, it can be directly or indirectly connected to the other element, wherein the indirect connection includes "connection" via a wireless communication network.

It will be understood that the terms "include" when used in this specification, specify the presence of stated features, integers, steps, operations, elements, and/or components, but do not preclude the presence or addition of one or more other features, integers, steps, operations, elements, components, and/or groups thereof.

It will be understood that when it is stated in this specification that a member is located "on" another member, not only a member may be in contact with another member, but also still another member may be present between the two members.

It will be understood that, although the terms first, second, etc. may be used herein to describe various elements, these elements should not be limited by these terms.

It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

Hereinafter, an operation principle and embodiments will be described in detail with reference to the accompanying drawings.

FIG. 1 illustrates a configuration of a vehicle according to an embodiment.

As shown in FIG. 1, a vehicle 1 includes a driving device 20, a brake device 30, a steering device 40 and a driver assistance apparatus 100, which communicate with each other through a vehicle communication network. For example, the electric devices 20, 30, 40, and 100 included in the vehicle 1 may transmit/receive data through Ethernet, media oriented systems transport (MOST), a FlexRay, controller area network (CAN), local interconnect network (LIN), and the like.

The driving device 20 that moves the vehicle 1 may include, for example, an engine, an engine management system (EMS), a transmission, and a transmission control unit (TCU).

The engine generates power for the vehicle 1 to drive, and the EMS may control the engine, in response to a driver's acceleration intention through an accelerator pedal or a request from the driver assistance apparatus 100.

The transmission transmits the power generated by the engine to wheels, and the TCU may control the transmission in response to a driver's shift command through a shift lever and/or a request from the driver assistance apparatus 100.

The brake device 30 to stop the vehicle 1 may include, for example, a brake caliper and an electronic brake control module (EBCM).

The brake caliper may decelerate or stop the vehicle 1 by using friction with a brake disc, and the EBCM may control the brake caliper in response to a driver's braking intention through a brake pedal and/or a request from the driver assistance apparatus 100.

For instance, the EBCM may receive a deceleration request including deceleration from the driver assistance apparatus 100, and control the brake caliper electrically or hydraulically to decelerate the vehicle 1 based on the requested deceleration.

The steering device 40 may include an electronic power steering control module (EPS).

The steering device 40 may change a driving direction of the vehicle 1, and the EPS may assist an operation of the steering device 40 so that the driver may easily operate the steering wheel in response to the driver's steering intention through the steering wheel. Also, the EPS may control the steering device 40 in response to the request from the driver assistance apparatus 100. For instance, the EPS may receive a steering request including a steering torque from the driver assistance apparatus 100, and control the steering device 40 to steer the vehicle 1 based on the requested steering torque.

The driver assistance apparatus 100 may provide the user with a variety of functions. For example, the driver assistance apparatus 100 may provide functions such as a lane departure warning (LDW), a lane keeping assist (LKA), a high beam assist (HBA), an autonomous emergency braking (AEB), a traffic sign recognition (TSR), an adaptive cruise control (ACC), a blind spot detection (BSD), and the like.

The driver assistance apparatus 100 includes a camera 110, a radar 120 and a controller 140. However, the driver assistance apparatus 100 is not limited to the configuration shown in FIG. 1, and may further include a lidar to detect an object by scanning around the vehicle 1.

As shown in FIG. 2, the camera 110 may have a field of view 110a facing the front of the vehicle 1. For example, the camera 110 may be mounted on a front windshield of the vehicle 1.

The camera 110 may photograph the front of the vehicle 1 to acquire image data of the front of the vehicle 1. The image data of the front of the vehicle 1 may include information about other vehicles, pedestrians, cyclists, or lanes (a marker for distinguishing the lanes) located in front of the vehicle 1.

The camera 110 may a plurality of lens and image sensors. The image sensors may include a plurality of photodiodes converting light into an electrical signal, and the plurality of photodiodes may be arranged in a two-dimensional (2D) matrix.

The camera 110 may be electrically connected to the controller 140. For instance, the camera 110 may be connected to the controller 140 via a vehicle communication network (NT), a hard wire or a printed circuit board (PCB). The camera 110 may transmit the image data of the front of the vehicle 1 to the controller 140.

As shown in FIG. 2, the radar 120 may have a field of sensing 120a facing the front of the vehicle 1. For example, the radar 120 may be installed in a grille or a bumper of the vehicle 1.

The radar 120 may include a transmission antenna (or a transmission antenna array) that transmits a transmission wave toward the front of the vehicle 1, and a receiving antenna (or a receiving antenna array) that receives a reflected wave reflected from an object. The radar 120 may acquire detection data from the transmission wave transmitted by the transmission antenna and the reflected wave received by the receiving antenna. The detection data may include distance information and speed information about other vehicles, pedestrians, or cyclists located in front of the vehicle 1. Also, the radar 120 may calculate a relative distance to the object based on a phase difference (or a time difference) between the transmission wave and the reflected wave, and calculate a relative speed of the object based on a frequency difference between the transmission wave and the reflected wave.

For instance, the radar 120 may be connected to the controller 140 via a vehicle communication network (NT), a hard wire or a PCB. The radar 120 may transmit the detection data to the controller 140.

The controller 140 may be electrically connected to the camera 110 and the radar 120. Also, the controller 140 may be connected to the driving device 20, the brake device 30, the steering device 40, a display device 50 and an audio device 60.

The controller 140 includes a processor 141 and a memory 142.

The processor 141 may process the image data of the camera 110 and the detection data of the radar 120, and also generate a driving signal, a brake signal, and a steering signal for controlling the driving device 20, the brake device 30, and the steering device 40. For instance, the processor 141 may include an image processor for processing the image data of the camera 110, a digital signal processor for processing the detection data of the radar 120, and/or a micro control unit (MCU) for generating the driving signal, the brake signal and the steering signal.

The processor 141 may detect objects (e.g. other vehicles, pedestrians, cyclists, and the like) located in front of the vehicle 1, based on the image data of the camera 110 and the detection data of the radar 120.

The processor 141 may acquire a relative location (a distance from the vehicle and an angle to a driving direction) and a type (e.g. whether an object is another vehicle, a pedestrian or a cyclist) of the front object of the vehicle 1, based on the image data. The processor 141 may acquire the relative location (the distance from the vehicle and the angle to the driving direction) and relative speed of the front object of the vehicle 1, based on the detection data of the radar 120. Also, the processor 141 may match the object identified based on the detection data with the object identified based on the image data, and based on the matching result, may acquire the type, the relative location and the relative speed of the object of the vehicle 1.

The processor 141 may generate the driving signal, the brake signal, and the steering signal based on the relative location and relative speed of the object located in front of the vehicle 1. For instance, the processor 141 may transmit, to the driving device 20 and/or the brake device 30, the driving signal and/or the brake signal for enabling a distance to a vehicle ahead (or a time until reaching a position of the vehicle ahead) to be equal to a distance set by the driver. The processor 141 may calculate a time to collision (TTC, or a distance to collision TTD) between the vehicle 1 and the front object, based on a location (distance) and relative speed of the front object, and provide the driver with a collision warning or transmit the brake signal to the brake device 30, based on comparison of the TTC and a reference value. Also, when it is identified that a collision with the front object is likely to occur based on the TTC or TTD, the processor 141 may transmit the steering signal to the steering device 40 in order to avoid the collision with the front object.

The processor 141 may control the steering device 40 to assist in steering for avoiding the collision of the vehicle 1, so that the vehicle 1 does not cross a target lane. For instance, the processor 141 may minimize a collision risk that may occur when the driver operates the steering device 40 to avoid the collision of the vehicle 1, as shown in FIG. 3.

FIGS. 3A and 3B are diagrams illustrating operations of the vehicle 1 based on a conventional driver evasive steering assistance system.

For instance, when the vehicle 1 is likely to collide with a first object 300, a driver may attempt to avoid the collision between the vehicle 1 and the first object 300, through an operation of the steering device 40, e.g., through manipulation of a steering wheel. In this case, the processor 141 may assist the operation of the steering device 40 through assistance control such as providing assist torque to a torque of the steering wheel or making the steering wheel light.

Referring to FIG. 3A, conventionally, when an assist torque is provided to the torque of the steering wheel by the processor 141, steering greater than intended by the driver occurs, and thus the vehicle 1 may deviate from a lane as shown in FIG. 3A.

Also, referring to FIG. 3B, conventionally, when an assist torque that assists countersteering is provided to the torque of the steering wheel by the processor 141, assist torque greater than intended by the driver is generated, and thus the vehicle 1 may collide with the first object 300 as shown in FIG. 3B.

Accordingly, when the driver controls the steering device 40 to steer the vehicle 1, the processor 141 is required to differently control whether to provide an assist torque and the control amount of assist torque depending on a situation of the vehicle 1.

To this end, the processor 141 may calculate a target heading angle and a target lateral position of the vehicle 1 based on a predetermined yaw rate pattern (also referred to as a yaw rate function or a yaw rate equation).

The predetermined yaw rate pattern may be stored in the memory 142. The predetermined yaw rate pattern is for controlling whether to provide the assist torque and the control amount of assist torque, and may be represented by a graph shown in FIG. 4.

FIG. 4 is a diagram illustrating a predetermined yaw rate pattern according to an embodiment.

Referring to FIG. 4, the yaw rate pattern may be in a form of a sine wave graph of a target yaw rate per time (also referred to as a target yaw rate). When the yaw rate pattern is designed in the form of sine wave graph, an avoidance distance and a countersteer distance of the vehicle 1 may be equal. Based on the yaw rate pattern described above, a function corresponding to a target driving trajectory of the vehicle 1 to prevent the vehicle 1 from colliding with the first object 300 which is a collision avoidance object, and to minimize a lateral movement distance may be derived.

The predetermined yaw rate pattern corresponds to a target driving trajectory of the vehicle 1 that allows the vehicle 1 to be spaced apart from the first object 300 by a predetermined distance, when steering for avoiding the collision of the vehicle 1.

The predetermined yaw rate pattern may be expressed as a function like Equation 1 below, and the function expressed in Equation 1 below may be stored in the memory 142.

Equation 1 below and equations to be described later are determined by designing a collision avoidance between the vehicle 1 and the first object 300 which is a collision avoidance object under conditions shown in FIG. 5.

FIG. 5 is a diagram illustrating a collision avoidance design of the vehicle 1 according to an embodiment.

The following equations are described with reference to FIG. 5.

$$\gamma_{des}(t) = A \cdot \sin\left(t \cdot \frac{2\pi}{\tau}\right) \quad \text{[Equation 1]}$$

Here, $\gamma_{des}$ designates a target yaw rate, $\tau$ designates a control time in FIGS. 4 and 5, that is, a total control time for the vehicle 1 to avoid a collision, and t designates a time. Also, A may be calculated by, $$A = \left(\hat{y}_T + \frac{W_T + W_S}{2} + O_{des}\right) / \quad \text{[Equation 2]}$$

-continued $$\left(-v_x \cdot \sin\left(\hat{x}_T \cdot \frac{2\pi}{X_{des}}\right) \cdot \left(\frac{X_{des}}{2\pi \cdot v_x}\right)^2 + \frac{X_{des}}{2\pi \cdot v_x} \cdot \hat{x}_T\right)$$

where $\hat{y}_\tau$ designates a position on y-axis of the first object 300 predicted at a time to collision as shown in FIG. 5, $W_T$ designates a width of the first object 300 as shown in FIG. 5, $W_S$ designates a width of the vehicle 1 shown in FIG. 5, $O_{des}$ designates a predetermined distance shown in FIG. 5, $v_x$ designates a speed of the vehicle 1, $\hat{x}_T$ designates a position on x-axis of the first object 300 predicted at the time to collision as shown in FIG. 5, and $X_{des}$ designates a target position on the x-axis of the vehicle 1 as shown in FIG. 5.

Based on Equation 1, the processor 141 may calculate a target lateral acceleration and a target lateral speed by Equations 3 and 4 below.

$$a_{y,des}(t) = v_x \cdot A \cdot \sin\left(t \cdot \frac{2\pi}{\tau}\right) \qquad \text{[Equation 3]}$$

where $a_{y,des}$ is the target lateral acceleration.

$$v_{y,des}(t) = -v_x \cdot A \cdot \cos\left(t \cdot \frac{2\pi}{\tau}\right) \cdot \frac{\tau}{2\pi} + C_1 \qquad \text{[Equation 4]}$$

Here, $v_{y,des}$ is the target lateral speed, and $C_1$ may be calculated by, $$C_1 = v_x \cdot A \cdot \frac{\tau}{2\pi} \qquad \text{[Equation 5]}$$

The processor 141 may represent a target trajectory for driving of the vehicle 1 as a function expressed in Equation 6 below.

$$y_{des}(t) = -v_x \cdot A \cdot \sin\left(t \cdot \frac{2\pi}{\tau}\right) \cdot \left(\frac{\tau}{2\pi}\right)^2 + C_1 \cdot t + C_2 \qquad \text{[Equation 6]}$$

where $y_{des}$ designates the target trajectory for driving of the vehicle 1, and $C_2$ may be equal to $y_{des}(0)$ and may be 0.

Referring to FIG. 5, when the vehicle 1 is steered to avoid the collision, the target driving trajectory of the vehicle 1 may be equal to $y_{des}(x)$ obtained by converting a function for t in Equation 6 into a function for x. The target trajectory may be designed so that the vehicle 1 is spaced apart from the first object 300 which is the collision avoidance object by the predetermined distance ($O_{des}$). Also, $y_{des}(x)$ may be a target lateral position.

Following conditions are required to be satisfied at a point 502 and a point 504 of FIG. 5 in order for the vehicle 1 to travel on the target trajectory.)

The point 502: $y_{des}(0)=0$, $v_{y,des}(0)=0$
The point 504:

$$y_{des}(\hat{x}_T) = \hat{y}_T + \frac{W_T + W_S}{2} + O_{des}$$

Here, $y_{des}(x)$ is the target lateral position, $v_{y,des}$ is the target lateral speed, $\hat{x}_T$ is the position on the x-axis of the first object 300 predicted at the time to collision as shown in FIG. 5, $\hat{y}_T$ is the position on the y-axis of the first object 300 predicted at the time to collision as shown in FIG. 5, $W_T$ is the width of the first object 300, $W_S$ is the width of the vehicle 1, and $O_{des}$ is the predetermined distance.

At the point 502, when a first position of the vehicle 1 is 0, the target lateral speed of the vehicle 1 is 0. Accordingly, $C_1$ and $C_2$ may be calculated as follows.

$$v_{y,des}(0) = v_{y,des}(\tau) = 0 \rightarrow C_1 = v_x \cdot A \cdot \frac{\tau}{2\pi}$$

$$y_{des}(0) = C_2 = 0$$

The processor 141 may convert the function for t in Equation 6 into the function for x, to derive a function expressed in Equation 7 below.

$$y_{des}(x) = -v_x \cdot A \cdot \sin\left(x \cdot \frac{2\pi}{X_{des}}\right) \cdot \left(\frac{X_{des}}{2\pi \cdot v_x}\right)^2 + A \cdot \frac{X_{des}}{2\pi \cdot v_x} \cdot x \qquad \text{[Equation 7]}$$

The processor 141 may calculate A in Equation 2 described above through Equation 8, so that the target trajectory and the first object 300 may not overlap.

$$y_{des}(\hat{x}_T) = -v_x \cdot A \cdot \sin\left(\hat{x}_T \cdot \frac{2\pi}{X_{des}}\right) \cdot \left(\frac{X_{des}}{2\pi \cdot v_x}\right)^2 + \qquad \text{[Equation 8]}$$
$$A \cdot \frac{X_{des}}{2\pi \cdot v_x} \cdot \hat{x}_T$$
$$= \hat{y}_T + \frac{W_T + W_S}{2} + O_{des}$$

As described above, when the vehicle 1 is steered to avoid the collision, $O_{des}$ which is the predetermined distance to the first object 300 which is the collision avoidance object may be referred to as a design variable, and refer to a safety distance between the vehicle 1 and the first object 300.

When $O_{des}$ is less than 0, a trajectory in which the vehicle 1 and the first object 300 collide with each other at a predicted collision time may be designed. By contrast, when $O_{des}$ is 0.5 m, a trajectory may be designed so that the vehicle 1 is spaced apart from the first object 300 by a lateral distance of 0.5 m at a predicted collision time between the vehicle 1 and the first object 300.

The processor 141 may calculate by differentiating $y_{des}(X)$ in Equation 7 with respect to x, to derive a function expressed in Equation 9 below.

$$\emptyset_{des}(x) = -v_x \cdot A \cdot \cos\left(x \cdot \frac{2\pi}{X_{des}}\right) \cdot \frac{X_{des}}{2\pi} \left(\frac{1}{v_x}\right)^2 + A \cdot \frac{X_{des}}{2\pi \cdot v_x} \qquad \text{[Equation 9]}$$

where $\emptyset_{des}$ designates a target heading angle.

The processor 141 may convert the function for x in Equation 9 into the function for t, to derive a function expressed in Equation 10 below.

$$\emptyset_{des}(t) = -v_x \cdot A \cdot \cos\left(t \cdot \frac{2\pi}{\tau}\right) \cdot \frac{\tau}{2\pi} \left(\frac{1}{v_x}\right) + A \cdot \frac{\tau}{2\pi} \qquad \text{[Equation 10]}$$

According to the embodiment of FIG. 5 described above, the processor 141 may derive Equation 6 which is the target lateral position function and Equation 10 which is the target heading angle function, based on Equation 1 that expresses the predetermined yaw rate pattern as a function, thereby calculating the target lateral position and the target heading angle of the vehicle 1.

FIGS. 6A, 6B and 6C are graphs illustrating a predetermined yaw rate pattern, a target heading angle function and a target lateral position function corresponding to yaw rate pattern according to an embodiment.

A graph of the predetermined yaw rate pattern may be in a sine wave form as shown in FIG. 6A. A graph of the target heading angle function corresponding to yaw rate pattern may be as shown in FIG. 6B, and a graph of the target lateral position function corresponding to yaw rate pattern may be as shown in FIG. 6C.

The processor 141 may control the steering device 40 to assist in steering for avoiding a collision of the vehicle 1, based on at least one of image data acquired through the camera 110, a calculated target heading angle or a calculated target lateral position.

For instance, when the driver operates the steering device 40 that steers the vehicle 1 to avoid the collision of the vehicle 1, the processor 141 may control the steering device 40 to assist in steering for avoiding the collision of the vehicle 1.

The processor 141 may predict the collision between the vehicle 1 and at least one object, e.g., the first object 300, based on the image data acquired through the camera 110 and/or detection data of the radar 120.

The processor 141 may identify a predicted heading angle and a predicted lateral position of the vehicle 1 based on the prediction of the collision.

Since a collision prediction and prediction of a heading angle and a lateral position of the vehicle 1 based on the collision prediction are conventional art, a detailed description thereof is omitted herein.

The processor 141 may control the steering device 40 to assist in steering for avoiding the collision of the vehicle 1, based on the target heading angle, the target lateral position, the predicted heading angle and/or the predicted lateral position.

For instance, the processor 141 may calculate a steering torque (also referred to as an assist torque) of the steering device 40, based on the target heading angle, a difference between the target heading angle and the predicted heading angle, the target lateral position, and a difference between the target lateral position and the predicted lateral position.

For example, the processor 141 may calculate the steering torque based on Equation 11 below.

$$T_{assist} = k_y \cdot e_y + k_\phi \cdot e_\phi \quad \text{[Equation 11]}$$

$$e_{y,\phi} = \begin{cases} e_{y,\phi} \geq 0 \left( t < \dfrac{\tau}{2} \right) \\ e_{y,\phi} \leq 0 \left( t \geq \dfrac{\tau}{2} \right) \end{cases}$$

Herein, $T_{assist}$ designates the steering torque, $e_y$ designates the difference between the target lateral position and the predicted lateral position, $e_\phi$ designates the difference between the target heading angle and the predicted heading angle, designates a gain for the predicted lateral position, and designates a gain for the predicted heading angle. The gain for the predicted lateral position and the gain for the predicted heading angle may be predetermined.

The processor 141 may control the steering device 40 to assist in steering for avoiding the collision of the vehicle 1, based on control of the steering device 40 according to the calculated steering torque.

As shown in FIG. 7, the processor 141 may determine the driver's avoidance intention at the time of an autonomous emergency braking (AEB) warning, and perform operations of controlling the steering device 40 to assist in steering for avoiding the collision of the vehicle 1 according to embodiments of the disclosure.

FIG. 7 is a diagram illustrating an operation of controlling the steering device 40 to assist in steering for collision avoidance of the vehicle 1 according to an embodiment.

Referring to FIG. 7, while driving, the processor 141 may predict a collision between the vehicle 1 and at least one object, e.g., the first object 300, and identify a predicted heading angle and a predicted lateral position of the vehicle 1.

For example, the processor 141 may provide a driver with a collision warning 702 by controlling an outputter (not shown) such as a speaker and/or a display, etc., of the vehicle 1, based on the prediction of the collision.

The processor 141 may divide an assistance control into a first assistance control and a second assistance control on the basis of τ/2. In the first assistance control, the driver operates 704 a steering wheel in a first direction, and in the second assistance control, the driver operates 706 the steering wheel in a second direction opposite to the first direction. τ/2 refers to a total control time for the vehicle 1 to avoid the collision, that is, half of a total estimated time for the vehicle 1 to travel on a target trajectory of the vehicle 1 for collision avoidance.

In the first assistance control, an assist torque (also referred to as a steering torque) that may assist in steering of the steering device 40 may be generated and/or applied with respect to a predictable collision in an avoidance direction of the vehicle 1.

In the second assistance control, an assist torque (also referred to as a steering torque) that may assist in steering of the steering device 40 may be generated and/or applied with respect to a predictable collision in a return direction of the vehicle 1.

For instance, when the vehicle 1 operates to avoid the collision, the processor 141 may feedback-calculate the assist torque based on a target trajectory 708 for driving of the vehicle 1, so that the assist torque intervenes with respect to insufficient torque for avoidance steering.

Also, for instance, when countersteering is performed, the processor 141 may feedback-calculate the assist torque so that the assist torque intervenes with respect to insufficient torque for return steering.

Accordingly, the processor 141 may assist the driver's steering operation for collision avoidance adaptively depending on a movement state of the vehicle 1 even in an emergency situation.

The memory 142 may store a program and/or data for the processor 141 to process image data, a program and/or data to process detection data, and a program and/or data for the processor 141 to generate a driving signal, a brake signal and/or a steering signal.

The memory 142 may temporarily store the image data received from the camera 110, the detection data received from the radar 120, and/or processing results of the image data and/or the detection data of the processor 141.

The memory 142 may include a volatile memory such as a static random access memory (S-RAM) and a dynamic random access memory (D-RAM) and a non-volatile memory such as a flash memory, a read only memory (ROM), an erasable programmable read only memory (EPROM), and the like.

The driver assistance apparatus 100 is not limited to that illustrated in FIG. 2, and may further include a lidar that detects an object by scanning around the vehicle 1.

FIG. 8 is a flowchart illustrating operations of the driver assistance apparatus 100 (or the controller 140 of the driver assistance apparatus 100 or the processor 141 of the driver assistance apparatus 100) according to an embodiment.

The driver assistance apparatus 100 may calculate a target heading angle and a target position of the vehicle 1 (802).

The driver assistance apparatus 100 may calculate the target heading angle and a target lateral position of the vehicle 1, based on a predetermined yaw rate pattern stored in the memory 142.

For example, the driver assistance apparatus 100 may calculate a target lateral acceleration and a target lateral speed of the vehicle 1, based on the predetermined yaw rate pattern and a speed of the vehicle 1. The driver assistance apparatus 100 may calculate the target heading angle and the target lateral position of the vehicle 1, based on the target lateral acceleration and the target lateral speed.

As described above, the predetermined yaw rate pattern may be in a form of a sine wave graph as shown in FIG. 4, and may be expressed as the function like Equation 1.

The target heading angle of the vehicle 1 may be a target heading angle per time, and be calculated by Equation 10 which is the target heading angle function based on Equation 1. The target lateral position of the vehicle 1 may be a target lateral position per time, and be calculated by Equation 6 which is the target lateral position function based on Equation 1.

The driver assistance apparatus 100 may identify whether the driver operates the steering device 40 that steers the vehicle 1 to avoid the collision of the vehicle 1 (804).

The driver assistance apparatus 100 may perform an operation 806 when the driver operates the steering device 40. Otherwise, the driver assistance apparatus 100 may end operations according to the embodiment.

The driver assistance apparatus 100 may control the steering device 40 to assist in steering for avoiding the collision of the vehicle 1 (806).

The driver assistance apparatus 100 may control the steering device 40 to assist in steering for avoiding the collision of the vehicle 1, based on image data acquired through the camera 110, the target heading angle and/or the target lateral position.

The driver assistance apparatus 100 may predict a collision between the vehicle 1 and at least one object, e.g., the first object 300, based on the image data acquired through the camera 110.

The driver assistance apparatus 100 may identify a predicted heading angle and a predicted lateral position of the vehicle 1 based on the prediction of the collision.

The driver assistance apparatus 100 may control the steering device 40 to assist in steering for avoiding the collision of the vehicle 1, based on the target heading angle, the target lateral position, the predicted heading angle and the predicted lateral position. For instance, the driver assistance apparatus 100 may calculate a steering torque of the steering device 40, based on the target heading angle, a difference between the target heading angle and the predicted heading angle, the target lateral position, and a difference between the target lateral position and the predicted lateral position. For example, the driver assistance apparatus 100 may calculate the steering torque of the steering device 40 based on Equation 11 described above.

The driver assistance apparatus 100 may control the steering device 40 to assist in steering for avoiding the collision of the vehicle 1, based on control of the steering device 40 based on the steering torque.

FIG. 9 is a diagram illustrating a collision avoidance operation of the vehicle 1 based on control of the driver assistance apparatus 100 according to an embodiment.

Referring to FIG. 9, when a collision between the vehicle 1 and the first object 300 is predicted by the driver assistance apparatus 100 and/or a driver, the driver may attempt to avoid the collision between the vehicle 1 and the first object 300 by operating 904 the steering device 40.

In this instance, the driver assistance apparatus 100 may identify a predicted heading angle and a predicted lateral position of the vehicle 1, thereby may predict a trajectory 908 of a driving path in which the vehicle 1 will travel as shown in FIG. 9. Hereinafter, the trajectory 908 of the driving path in which the vehicle 1 will travel is referred to as the predicted trajectory 908.

The driver assistance apparatus 100 may predict a collision area 906 between the vehicle 1 and the first object 300 as shown in FIG. 9, based on the predicted trajectory 908. According to the embodiment described above, the driver assistance apparatus 100 may operate to avoid the collision.

When the vehicle 1 which is driving is predicted to collide with the first object 300, the driver assistance apparatus 100 may identify (also referred to as 'determine') the target trajectory 708 for driving of the vehicle 1 according to the above-described embodiment. Also, when the collision is predicted to occur, the driver assistance apparatus 100 may control an outputter of the vehicle 1 to output a collision warning 902.

When the driver operates 904 the steering device 40, for example, operates 904 a steering wheel in a first direction, to avoid the collision between the vehicle 1 and the first object 300, the driver assistance apparatus 100 may identify (also referred to as 'determine') the predicted trajectory 908 of the vehicle 1. For example, the driver assistance apparatus 100 may identify a predicted heading angle and a predicted lateral position, thereby may identify the predicted trajectory 908 of the vehicle 1.

The driver assistance apparatus 100 may calculate a steering torque to make the predicted trajectory 908 to be the same as the target trajectory 708, and control the steering device 40 based on the calculated steering torque. A detailed description on the calculation of the steering torque is omitted, since it has been described above.

The collision between the vehicle 1 and the first object 300 may be prevented due to the above-described operations of the driver assistance apparatus 100.

FIGS. 10A, 10B and 10C are graphs illustrating a target driving trajectory and a predicted driving trajectory of the vehicle 1 according to an embodiment.

FIG. 10A shows a waveform representing a predetermined yaw rate pattern corresponding to the target trajectory 708 of FIG. 9, and a waveform representing a yaw rate pattern corresponding to the predicted trajectory 908 of FIG. 9.

FIG. 10B shows a waveform of a target heading angle corresponding to the target trajectory 708 of FIG. 9 and based on the predetermined yaw rate pattern, and a waveform of a predicted heading angle corresponding to the predicted trajectory 908 of FIG. 9.

A waveform of a target lateral position of FIG. 10C may correspond to the target trajectory 708 of FIG. 9. A waveform of a predicted lateral position of FIG. 10C may correspond to the predicted trajectory 908 of FIG. 9.

The driver assistance apparatus 100 may calculate a steering torque (or an assist torque) of the steering device 40 that may assist in steering for collision avoidance, based on a difference $e_\theta$ between the target heading angle and the predicted heading angle and a difference $e_y$ between the target lateral position and the predicted lateral position, as shown in FIGS. 10B and 10C. A detailed description on the calculation of the steering torque of the steering device 40 is omitted, since it has been described above.

FIG. 11 is a diagram illustrating a collision avoidance operation of the vehicle 1 based on control of the driver assistance apparatus 100 according to an embodiment.

Referring to FIG. 11, a driver may operates 1104 a steering wheel, that is, countersteering 1104, to prevent the vehicle 1 from departing from a lane. In this instance, the driver assistance apparatus 100 may identify a predicted heading angle and a predicted lateral position of the vehicle 1, thereby may predict a trajectory 1108 of a driving path in which the vehicle 1 will travel, as shown in FIG. 11.

For instance, when the vehicle 1 which is driving is predicted to collide with the first object 300, the driver assistance apparatus 100 may identify the target trajectory 708 for driving of the vehicle 1. Also, when the collision is predicted to occur, the driver assistance apparatus 100 may control an outputter of the vehicle 1 to output a collision warning 1102. Afterwards, through lane change, when the vehicle 1 drives in a first lane next to a second lane in which the first object 300 travels, the driver may operate 1104 the steering device 400, e.g., a steering wheel, to prevent a lane departure. Based on the driver's operation described above, the driver assistance apparatus 100 may predict the trajectory 1108 of the driving path in which the vehicle 1 will travel. Hereinafter, the trajectory 1108 of the driving path in which the vehicle 1 will travel is referred to as the predicted trajectory 1108.

For example, the driver assistance apparatus 100 may identify the predicted heading angle and the predicted lateral position, thereby may identify the predicted trajectory 1108 of the vehicle 1.

The driver assistance apparatus 100 may predict a lane departure of the vehicle 1 based on the predicted trajectory 1108. The driver assistance apparatus 100 may operate to prevent the vehicle 1 from departing from a lane according to the above-described embodiment.

For example, the driver assistance apparatus 100 may calculate a steering torque to make the predicted trajectory 1108 to be the same as the target trajectory 708, and control the steering device 40 based on the calculated steering torque. A detailed description on the calculation of the steering torque is omitted, since it has been described above.

The lane departure of the vehicle 1 may be prevented due to the above-described operations of the driver assistance apparatus 100.

FIGS. 12A, 12B and 12C are graphs illustrating a target driving trajectory and a predicted driving trajectory of the vehicle 1 according to an embodiment.

FIG. 12A shows a waveform representing a predetermined yaw rate pattern corresponding to the target trajectory 708 of FIG. 11, and a waveform representing a yaw rate pattern corresponding to the predicted trajectory 1108 of FIG. 11.

FIG. 12B shows a waveform of a target heading angle corresponding to the target trajectory 708 of FIG. 11 and based on the predetermined yaw rate pattern, and a waveform of a predicted heading angle corresponding to the predicted trajectory 1108 of FIG. 11.

A waveform of a target lateral position of FIG. 12C may correspond to the target trajectory 708 shown in FIG. 11. A waveform of a predicted lateral position of FIG. 12C may correspond to the predicted trajectory 1108 shown in FIG. 11.

The driver assistance apparatus 100 may calculate a steering torque (or an assist torque) of the steering device 40 that may assist in steering of the vehicle 1, based on a difference $e_\theta$ between the target heading angle and the predicted heading angle and a difference $e_y$ between the target lateral position and the predicted lateral position, as shown in FIGS. 12B and 12C. A detailed description on the calculation of the steering torque of the steering device 40 is omitted, since it has been described above.

FIG. 13 is a flowchart illustrating operations of the driver assistance apparatus 100 (or the controller 140 of the driver assistance apparatus 100 or the processor 141 of the driver assistance apparatus 100) according to an embodiment.

The driver assistance apparatus 100 may predict a collision between the vehicle 1 and at least one object, based on image data acquired through the camera 110 (1302).

The driver assistance apparatus 100 may calculate a target heading angle and a target lateral position of the vehicle 1, based on a predetermined yaw rate pattern and the prediction of the collision between the vehicle 1 and the at least one object, e.g., the first object 300 (1304).

For instance, when the vehicle 1 is predicted to collide with the at least one object, the driver assistance apparatus 100 may calculate the target heading angle and the target lateral position of the vehicle 1. A detailed description on the calculation of the target heading angle and the target lateral position is omitted, since it has been described above.

The driver assistance apparatus 100 may identify whether a driver operates the steering device 40 that steers the vehicle 1 to avoid the collision of the vehicle 1 (1306).

When the driver operates the steering device 40, the driver assistance apparatus 100 may perform an operation 1308. Otherwise, the driver assistance apparatus 100 may end operations according to the embodiment.

The driver assistance apparatus 100 may control the steering device 40 to assist in steering for avoiding the collision of the vehicle 1, based on at least one of the target heading angle or the target lateral position (1308).

A detailed description on the control of the steering device 40 is omitted, since it has been described above.

As is apparent from the above, according to the embodiments of the disclosure, the driver assistance apparatus and the driver assistance method can allow a vehicle to stably avoid a collision with an arbitrary object by adjusting an intervention and the control amount of assist torque based on a driver's operation depending on circumstances.

Embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include read only memory (ROM), random access memory (RAM), magnetic tapes, magnetic disks, flash memories, and optical recording medium.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:

1. A driver assistance apparatus, comprising:
   a camera mounted on a vehicle and having a field of view facing a front of the vehicle and acquire image data;
   a memory storing a predetermined sine wave form yaw rate pattern which is in a form of a sine wave graph indicating a predetermined desired yaw rate change over time, the predetermined sine wave form yaw rate pattern being stored in advance in the memory before a driver operates a steering device that steers the vehicle to avoid a collision of the vehicle; and
   a controller comprising a processor configured to process the image data,
   wherein the controller is configured to:
   calculate a target heading angle and a target lateral position of the vehicle based on the predetermined sine wave form yaw rate pattern stored in advance in the memory, and
   when the driver operates the steering device that steers the vehicle to avoid the collision of the vehicle, control the steering device for adjustment of the driver's operation of the steering device to allow the vehicle to maneuver using the predetermined sine wave form yaw rate pattern stored in advance in the memory, based on the image data, the target heading angle or the target lateral position.

2. The driver assistance apparatus of claim 1, wherein the controller is configured to control the steering device to assist in steering for avoiding the collision of the vehicle so that the vehicle does not cross a target lane.

3. The driver assistance apparatus of claim 1, wherein the controller is configured to:
   predict the collision between the vehicle and at least one object, based on the image data,
   identify a predicted heading angle and a predicted lateral position of the vehicle based on the prediction of the collision.

4. The driver assistance apparatus of claim 3, wherein the controller is configured to control the steering device to assist in steering for avoiding the collision of the vehicle, based on the target heading angle, the target lateral position, the predicted heading angle and the predicted lateral position.

5. The driver assistance apparatus of claim 4, wherein the controller is configured to:
   calculate a steering torque of the steering device based on the target heading angle, a difference between the target heading angle and the predicted heading angle, the target lateral position, and a difference between the target lateral position and the predicted lateral position, and
   control the steering device to assist in steering for avoiding the collision of the vehicle, based on control of the steering device based on the steering torque.

6. The driver assistance apparatus of claim 1, wherein the controller is configured to:
   calculate a target lateral acceleration and a target lateral speed of the vehicle based on the predetermined sine wave form yaw rate pattern and a speed of the vehicle, and
   calculate the target heading angle and the target lateral position based on the target lateral acceleration and the target lateral speed.

7. The driver assistance apparatus of claim 1, wherein, when the vehicle heads in a driving direction in a first lane and a first object identified based on the image data is in the first lane before the vehicle, the controller controls the steering device for adjustment of the driver's operation of the steering device to allow the vehicle to move to a position in a second lane adjacent to the first lane and to return to head in the same driving direction in the second lane, while remaining spaced apart from a first object at least by a predetermined distance, according to the predetermined sine wave form yaw rate pattern stored in advance in the memory.

8. A driver assistance method, comprising:
   calculating a target heading angle and a target lateral position of a vehicle based on a predetermined sine wave form yaw rate pattern which is in a form of a sine wave graph indicating a predetermined desired yaw rate change over time, wherein the predetermined sine wave form yaw rate pattern is stored in advance in a memory before a driver operates a steering device that steers the vehicle to avoid a collision of the vehicle; and
   when the driver operates the steering device that steers the vehicle to avoid the collision of the vehicle, controlling the steering device for adjustment of the driver's operation of the steering device to allow the vehicle to maneuver using the predetermined sine wave form yaw rate pattern stored in the memory in advance, based on image data acquired through a camera, the target heading angle or the target lateral position.

9. The driver assistance method of claim 8, wherein the controlling of the steering device comprises controlling the steering device so that the vehicle does not cross a target lane.

10. The driver assistance method of claim 8, wherein the controlling of the steering device comprises:
    predicting the collision between the vehicle and at least one object, based on the image data,
    identifying a predicted heading angle and a predicted lateral position of the vehicle based on the prediction of the collision, and
    controlling the steering device to assist in steering for avoiding the collision of the vehicle, based on the target heading angle, the target lateral position, the predicted heading angle and the predicted lateral position.

11. The driver assistance method of claim 10, wherein the controlling of the steering device comprises:
    calculating a steering torque of the steering device based on the target heading angle, a difference between the target heading angle and the predicted heading angle, the target lateral position, and a difference between the target lateral position and the predicted lateral position, and
    controlling the steering device to assist in steering for avoiding the collision of the vehicle, based on control of the steering device based on the steering torque.

12. The driver assistance method of claim 8, wherein the calculating of the target heading angle and the target lateral position comprises:
    calculating a target lateral acceleration and a target lateral speed of the vehicle based on the predetermined sine wave form yaw rate pattern and a speed of the vehicle, and calculating the target heading angle and the target lateral position based on the target lateral acceleration and the target lateral speed.

13. The driver assistance method of claim 8, wherein, when the vehicle heads in a driving direction in a first lane and a first object identified based on the image data is in the first lane before the vehicle, the controlling of the steering device comprises controlling the steering device for adjustment of the driver's operation of the steering device to allow the vehicle to move to a position in a second lane adjacent to the first lane and to return to head in the same driving direction in the second lane, while remaining spaced apart from a first object at least by a predetermined distance, when steering for avoiding the collision of the vehicle, according to the predetermined sine wave form yaw rate pattern stored in advance in the memory.

14. A driver assistance apparatus, comprising:
a camera mounted on a vehicle and configured to have a field of view facing a front of the vehicle and acquire image data; and
a memory storing a predetermined sine wave form yaw rate pattern which is in a form of a sine wave graph indicating a predetermined desired yaw rate change over time, the predetermined sine wave form yaw rate pattern being stored in advance in the memory before a driver operates a steering device that steers the vehicle to avoid a collision of the vehicle; and
a controller comprising a processor configured to process the image data,
wherein the controller is configured to:
predict a collision between the vehicle and at least one object based on the image data, calculate a target heading angle and a target lateral position of the vehicle based on the prediction of the collision between the vehicle and the at least one object and the predetermined sine wave form yaw rate pattern stored in advance in the memory, and
when the driver operates the steering device that steers the vehicle to avoid the collision of the vehicle, control the steering device for adjustment of the driver's operation of the steering device to allow the vehicle to maneuver using the predetermined sine wave form yaw rate pattern stored in advance in the memory, based on at least one of the target heading angle or the target lateral position.

15. The driver assistance apparatus of claim 14, wherein the controller is configured to identify whether the steering device that steers the vehicle to avoid the collision of the vehicle is operated by the driver, in response to the predicted collision between the vehicle and the at least one object.

16. The driver assistance apparatus of claim 14, wherein the controller is configured to control the steering device to assist in steering for avoiding the collision of the vehicle so that the vehicle does not cross a target lane.

17. The driver assistance apparatus of claim 14, wherein the controller is configured to:
predict the collision between the vehicle and the at least one object, based on the image data,
identify a predicted heading angle and a predicted lateral position of the vehicle based on the prediction of the collision.

18. The driver assistance apparatus of claim 17, wherein the controller is configured to control the steering device to assist in steering for avoiding the collision of the vehicle, based on the target heading angle, the target lateral position, the predicted heading angle and the predicted lateral position.

19. The driver assistance apparatus of claim 18, wherein the controller is configured to:
calculate a steering torque of the steering device based on the target heading angle, a difference between the target heading angle and the predicted heading angle, the target lateral position, and a difference between the target lateral position and the predicted lateral position, and
control the steering device to assist in steering for avoiding the collision of the vehicle, based on control of the steering device based on the steering torque.

20. The driver assistance apparatus of claim 14, wherein the controller is configured to:
calculate a target lateral acceleration and a target lateral speed of the vehicle based on the predetermined sine wave form yaw rate pattern and a speed of the vehicle, and
calculate the target heading angle and the target lateral position based on the target lateral acceleration and the target lateral speed.

* * * * *